United States Patent [19]

Sato et al.

[11] 4,178,302
[45] Dec. 11, 1979

[54] NEMATIC LIQUID CRYSTALLINE COMPOUNDS

[75] Inventors: Hisato Sato, Tokyo; Haruyoshi Takatsu, Kodaira; Masayuki Tazume, Urawa, all of Japan

[73] Assignee: Dainippon Ink & Chemicals, Inc., Tokyo, Japan

[21] Appl. No.: 962,618

[22] Filed: Nov. 21, 1978

[30] Foreign Application Priority Data

Apr. 11, 1978 [JP] Japan .................................. 53-41787

[51] Int. Cl.² .......................................... C07C 153/11
[52] U.S. Cl. ................................................ 260/455 R
[58] Field of Search ..................................... 260/455 R

[56] References Cited

FOREIGN PATENT DOCUMENTS 2603293 1/1976 Fed. Rep. of Germany ...... 260/455 R

Primary Examiner—John M. Ford
Assistant Examiner—Robert C. Whittenbaugh
Attorney, Agent, or Firm—Sherman & Shalloway

[57] ABSTRACT

Nematic liquid crystalline 4,4'-substituted derivatives of cyclohexene-1-carboxylic acid phenylthiol esters represented by the general formula

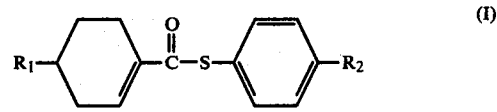

(I)

wherein $R_1$ is a linear alkyl group containing 3 to 7 carbon atoms, and $R_2$ is a linear alkoxy group containing 2 to 5 carbon atoms.

21 Claims, No Drawings

NEMATIC LIQUID CRYSTALLINE COMPOUNDS

This invention relates to novel nematic liquid crystalline compounds useful as electrooptical display materials.

The novel nematic liquid crystalline compounds of the invention are 4,4'-substituted derivatives of cyclohexene-1-carboxylic acid phenylthiol esters which are represented by the general formula

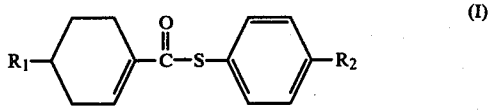

(I)

wherein $R_1$ represents a linear alkyl group containing 3 to 7 carbon atoms, and $R_2$ is a linear alkoxy group containing 2 to 5 carbon atoms.

All compounds corresponding to formula (I) are good nematic liquid crystals. Accordingly, the compounds of formula (I) can be applied either alone or as a mutual mixture or as a mixture with another nematic liquid crystalline compound and/or a non-nematic liquid crystalline compound to liquid display cells, for example field effect mode cells (F.E.M. cells) suggested by M. Schadt et al. [APPLIED PHYSICS LETTERS, 18, 127–128 (1971)] and dynamic scattering mode cells (D.S.M. cells) suggested by G. H. Heilmeier et al. [PROCEEDINGS OF THE I.E.E.E. 56, 1162–1171 (1968)].

Generally, the important characteristics required of nematic liquid crystalline compounds utilized in display elements such as F.E.M. cells and D.S.M. cells include the following.

(1) They should be able to permit a white clear display.

(2) They should be chemically stable, and resistant to degradation by moisture, light, etc., and have high reliability and a long service life.

(3) The nematic liquid crystal temperature should be within a broad range near room temperature, and the range of the operating temperature should be broad.

(4) They should have low viscosities and rapid response speeds. Particularly, they should have rapid speeds of response at low temperatures.

(5) They should be able to permit a free control of the operating voltage, and be able to be operated at low voltages. In other words, they should be able to permit a free control of the threshold voltage, and adjust it to a low value.

(6) There should be little variations in threshold voltage by temperature differences.

These requirements are very important in the commercial production of display elements of high performance. Generally, however, most of the conventional nematic liquid crystalline compounds cannot satisfy all of these requirements (1) to (6). For example, those which meet at least one of the requirements (1) and (2) are unsatisfactory in at least one of the requirements (3) to (6). Or those which satisfy at least one of the requirements (3) to (6) do not meet one or both of the requirements (1) and (2).

The present inventors made various investigations in order to provide novel nematic liquid crystalline compounds which can meet all of these requirements (1) to (6), and found that the compounds of formula (I) can achieve this purpose. Thus, the use of these compounds can afford liquid crystal display cells which are capable of operation at low voltages and of high speed response, permit clear displays, and have a long service life.

The physical characteristics of compounds of formula (I), which were produced in Examples to be given hereinbelow, are listed in Table 1 below. In the column headed "Transition temperature (°C.)" in the table, C represents a crystalline phase; S, a smectic phase; N, a nematic phase; I, an isotropic liquid phase; and the arrow, a transitional phase. The same abbreviations will be used throughout the description.

Table 1

| $R_1$ | $R_2$ | Transition temperature (°C.) | |
|---|---|---|---|
| n-$C_3H_7$— | —O—$C_2H_5$ | 66 (C⇌N) | 67.5 (N⇌I) |
| n-$C_4H_9$— | —O—$C_2H_5$ | 39 (C⇌N) | 59 (N⇌I) |
| n-$C_5H_{11}$— | —O—$C_2H_5$ | 41.5 (C⇌N) | 70.5 (N⇌I) |
| n-$C_6H_{13}$— | —O—$C_2H_5$ | 36 (C⇌N) | 63 (N⇌I) |
| n-$C_7H_{15}$— | —O—$C_2H_5$ | 38 (C⇌N) | 68 (N⇌I) |
| n-$C_3H_7$— | —O-n-$C_3H_7$ | 39 (C⇌N) | 47.5 (N⇌I) |
| n-$C_4H_9$— | —O-n-$C_3H_7$ | 19 (C⇌N) | 39.5 (N⇌I) |
| n-$C_5H_{11}$— | —O-n-$C_3H_7$ | 26 (C⇌N) | 54.5 (N⇌I) |
| n-$C_6H_{13}$— | —O-n-$C_3H_7$ | 40.5 (C⇌N) | 46 (N⇌I) |

Table 1-continued

R₁—⌬—C(=O)—S—⌬—R₂

| R₁ | R₂ | Transition temperature (°C.) |
|---|---|---|
| n-C₇H₁₅— | —O-n-C₃H₇ | 40.5 (C⇌N)  57 (N⇌I) |
| n-C₃H₇— | —O-n-C₄H₉ | 22 (C⇌N)  59.5 (N⇌I) |
| n-C₄H₉— | —O-n-C₄H₉ | 14 (C⇌N)  48 (N⇌I) |
| n-C₅H₁₁— | —O-n-C₄H₉ | 32 (C⇌N)  64 (N⇌I) |
| n-C₆H₁₃— | —O-n-C₄H₉ | 40 (C⇌N)  54.5 (N⇌I) |
| n-C₇H₁₅— | —O-n-C₄H₉ | 45 (C⇌N)  66.5 (N⇌I) |
| n-C₃H₇— | —O-n-C₅H₁₁ | 32 (C⇌N)  52 (N⇌I) |
| n-C₄—H₉— | —O-n-C₅H₁₁ | 41 (C⇌N)  44 (N⇌I) |
| n-C₅H₁₁— | —O-n-C₅H₁₁ | 33 (C⇌N)  59.5 (N⇌I) |
| n-C₆H₁₃— | —O-n-C₅H₁₁ | 28.5 (C⇌N)  54 (N⇌I) |
| n-C₇H₁₅— | —O-n-C₅H₁₁ | 43 (C⇌N)  61.5 (N⇌I) |

According to this invention, the compound of formula (I) is produced in the following manner.

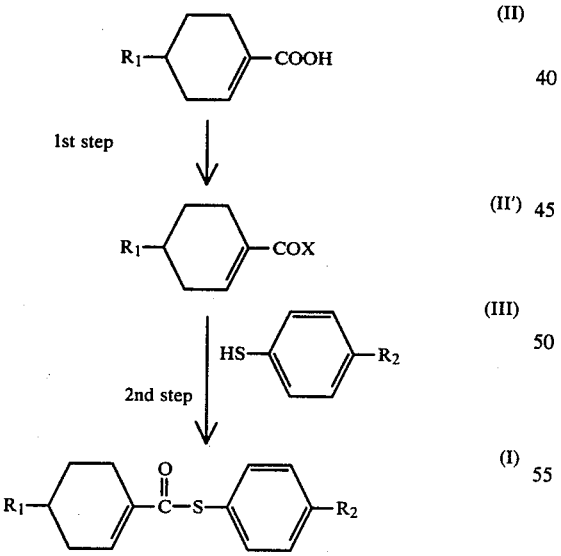

The first step comprises reacting the compound of formula (II) with a halogenating agent to produce the compound of formula (II') (wherein X represents a halogen atom such as F, Br, Cl, or I). X in formula (II') is preferably a chlorine atom, and a suitable halogenating agent is thionyl chloride. The reaction is carried out under atmospheric pressure at the refluxing temperature of the reaction mixture. The compound of formula (II') needs not to be isolated from the reaction mixture obtained by the reaction, and it is enough to remove the excess of the halogenating agent.

The second step comprises reacting the crude compound of formula (II') produced in the first step with the compound of formula (III) in an inert organic solvent. Examples of suitable inert organic solvents are diethyl ether, tetrahydrofuran, dimethyl formamide and benzene. To remove the hydrogen halide freed during the reaction out of the reaction system, it is desirable to include a basic substance such as pyridine or a tertiary amine into the inert organic solvent. The reaction is carried out under atmospheric pressure at a temperature of from −10° C. to room temperature. The reaction product is subjected to a series of purifying treatments including, for example, solvent extraction, washing with water, drying, and recrystallization to separate the desired compound of formula (I).

The starting compound of formula (II) can be produced by a process schematically shown below.

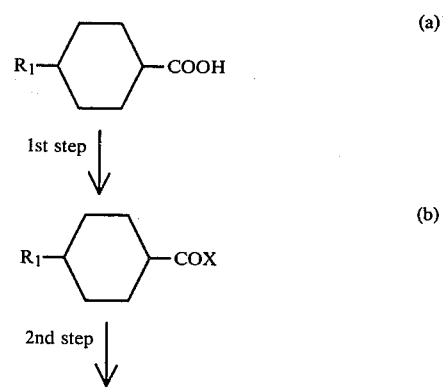

-continued

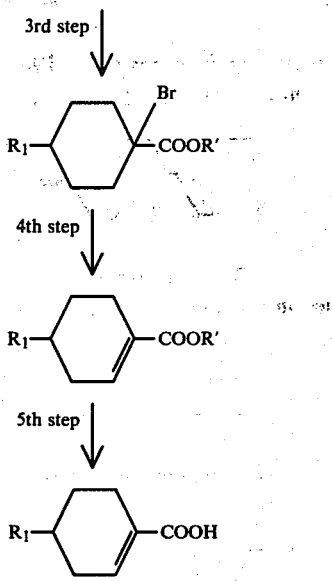

The first step comprises reacting the compound of formula (a) with a halogenating agent to produce the compound of formula (b). A suitable halogenating agent is thionyl chloride. The compound of formula (b) needs not to be isolated from the reaction mixture, and it is enough to remove the excess of the halogenating agent.

The second step comprises reacting the crude compound of formula (b) produced in the first step with bromine in the presence or absence of an inert organic solvent to form the compounds of formula (c). A suitable inert organic solvent is a chlorinated product of a lower hydrocarbon such as carbon tetrachloride, chloroform or dichloroethane. The mixture formed by the reaction is fed to the third step without isolating the compound of formula (c).

The third step comprises reacting the reaction mixture of the second step with an excess of a lower alcohol, distilling off the excess of the alcohol, and then subjecting the reaction product to a series of purifying treatments including solvent extraction, washing with water, drying, etc. to isolate the compound of formula (d) (wherein R' represents a lower alkyl group).

The fourth step comprises reacting the compounds of formula (d) produced in the third step with a dehalogenating agent in an alcohol, distilling off the alcohol, and subjecting the reaction product to a series of purifying treatments including solvent extraction, washing with water, drying, distillation, etc. to isolate the compound of formula (e). An especially preferred dehalogenating agent is 1,8-diazabicyclo(5,4,0)undecene-7.

The fifth step comprises hydrolyzing the compound of formula (e) produced in the fourth step with an alkaline aqueous solution of an alcohol, and recrystallizing the reaction product from aqueous methanol to form the compound of formula (II).

The compound of formula (II) so produced is a nematic liquid crystalline compound having the physical characteristics shown in Table 2.

Table 2

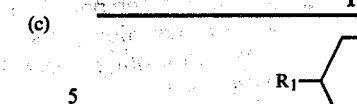

| $R_1$ | Transition temperature (°C.) | |
|---|---|---|
| | $C \rightleftarrows N$ | $N \rightleftarrows I$ |
| n-$C_3H_7$ | 113 | 130 |
| n-$C_4H_9$ | 77 | 115 |
| n-$C_5H_{11}$ | 83 | 121 |
| n-$C_6H_{13}$ | 89 | 114 |
| n-$C_7H_{15}$ | 58 | 104 |
| n-$C_8H_{17}$ | 65 | 113 |

The starting compound of formula (III) is produced in accordance with a process consisting of the following three steps.

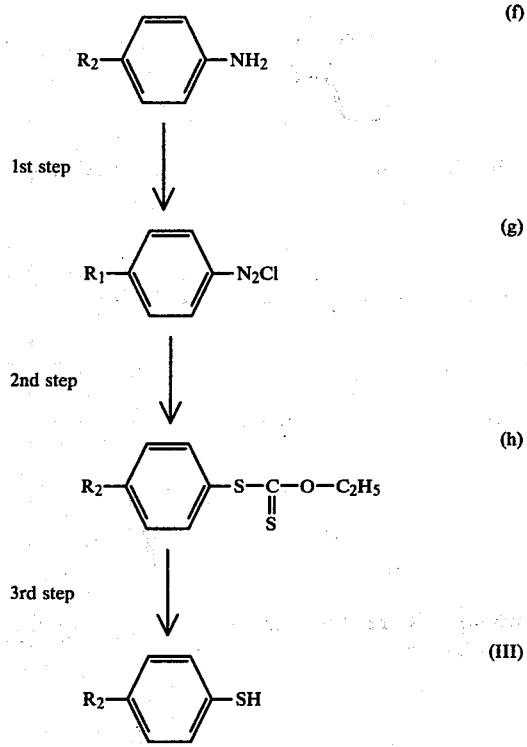

The first step comprises reacting the compound of formula (f) with hydrochloric acid using water as a reaction medium to form the corresponding hydrochloride, and reacting it with a nitrite salt at a low temperature to produce the compound of formula (g).

The second step comprises gradually adding the mixture formed by the first-step reaction to a heated aqueous solution of a xanthogenic acid salt to react them, and then extracting the reaction product to produce the compound of formula (h).

The third step comprises hydrolyzing the compound of formula (h) produced in the second step with an alcoholic alkaline solution, acidifying the hydrolyzate, and subjecting it to a series of purifying treatments including solvent extraction, washing with water, drying, distillation, etc. to isolate the compound of formula (III).

All of the compounds of formula (I) so produced are nematic liquid crystalline compounds having positive dielectric anisotropy. Accordingly, the compounds of formula (I) operate in a D.S.M. cell either alone, or as a mutual mixture, or as a mixture with another nematic liquid crystalline compound having negative dielectric anisotropy and/or its homolog, a non-nematic liquid crystalline compound (to be referred to as a compound N). A liquid crystalline composition consisting of a mixture of liquid crystals containing compounds of formula (I) in the aforesaid forms as a matrix and a nematic liquid crystalline compound having large positive dielectric anisotropy and/or its homolog, a non-nematic liquid crystalline compound (to be referred to as a compound P) operates in an F.E.M. cell.

Various compounds N or P can be mixed with the compounds of formula (I). Important compounds are listed below. Compounds (1) to (5) come within compounds N, and compounds (6) to (15) come within compounds P.

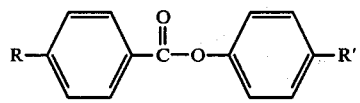 (1)

wherein R and R' each represent n—$C_mH_{2m+1}$—, n—$C_mH_{2m+1}$—O—,

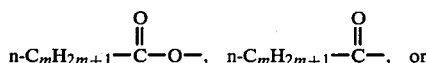

or

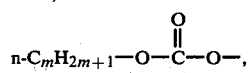

and m represents an integer of 1 to 10.

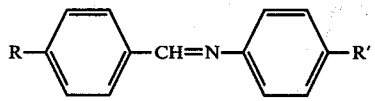 (2)

wherein R represents n—$C_mH_{2m+1}$—, n—$C_mH_{2m+1}$—O—, or

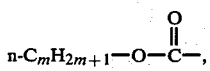,

R' represents n—$C_mH_{2m+1}$—, n—$C_mH_{2m+1}$—O—,

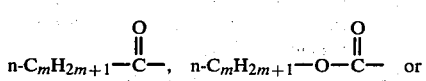 or n-$C_mH_{2m+1}$—C(=O)—O—, and m represents an integer of 1 to 10.

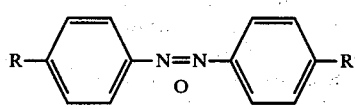 (3)

wherein R and R' each represent n—$C_mH_{2m+1}$—, n—$C_mH_{2m+1}$—O—,

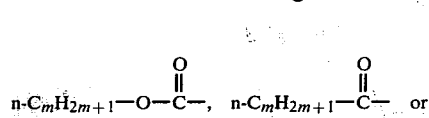

and m represents an integer of 1 to 10.

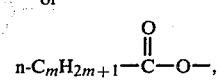 (4)

wherein R and R' each represent n—$C_mH_{2m+1}$—, n—$C_mH_{2m+1}$—O—,

and m represents an integer of 1 to 10.

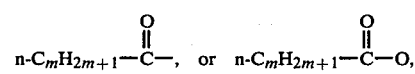 (5)

wherein R and R' each represent n—$C_mH_{2m+1}$— or n—$C_mH_{2m+1}$—O—, and m represents an integer of 1 to 10.

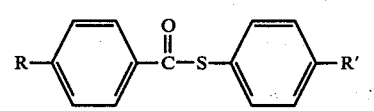 (6)

wherein R represents n—$C_mH_{2m+1}$—, n—$C_mH_{2m+1}$—O—,

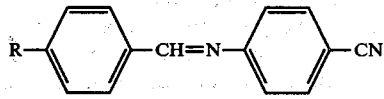

and m represents an integer of 1 to 10.

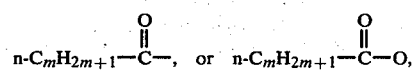 (7)

wherein R represents n—$C_mH_{2m+1}$—, and m represents an integer of 1 to 10.

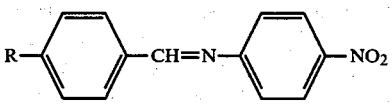 (8)

wherein R represents n—$C_mH_{2m+1}$— or n—$C_mH_{2m+1}$—O—, and m represents an integer of 1 to 10.

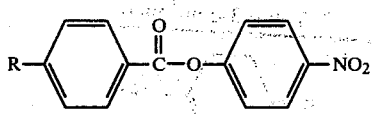 (9)

wherein R represents n—$C_mH_{2m+1}$— or n—$C_mH_{2m+1}$—O—, and m represents an integer of 1 to 10.

 (10)

wherein R represents n—$C_mH_{2m+1}$—, n—$C_mH_{2m+1}$—O— or

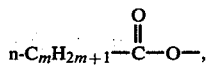

and m represents an integer of 1 to 10.

 (11)

wherein R represents n—$C_mH_{2m+1}$— or n—$C_mH_{2m+1}$—O—, and m represents an integer of 1 to 10.

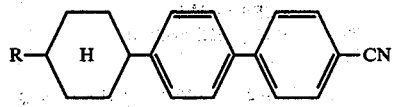 (12)

wherein R represents n—$C_mH_{2m+1}$— or n—$C_mH_{2m+1}$—O—, and m represents an integer of 1 to 10.

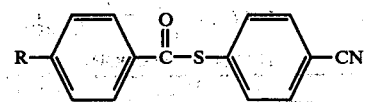 (13)

wherein R represents n—$C_mH_{2m+1}$—, and m represents an integer of 1 to 10.

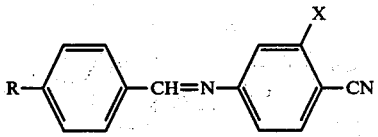 (14)

wherein R represents n—$C_mH_{2m+1}$—, X represents F, Cl, Br or I, and m represents an integer of 1 to 8.

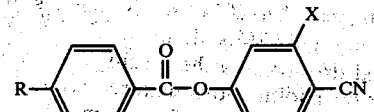 (15)

wherein R represents n—$C_mH_{2m+1}$—, X represents F, Cl Br or I, and m represents an integer of 1 to 8.

In using the compound of formula (I) in liquid crystal display cells, viscosity-reducing agents, ion-conducting agents, orienting agents and other adjuvants may, if desired, be added besides the other nematic liquid crystalline compounds and non-nematic liquid crystalline compounds as homologs thereof.

The following examples illustrate the present invention more specifically.

MATERIAL PRODUCTION EXAMPLE 1

170 g (1 mole) of the compound of the formula

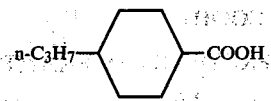

was dissolved in 500 g of thionyl chloride. The solution was stirred under reflux for 1 hour, and then, the excess of the thionyl chloride was distilled off. Then, 270 g of bromine was gradually added dropwise to the resulting reaction product at 70° to 80° C. The mixture was stirred at this temperature for 20 hours, and added to 500 ml of methanol. The mixture was stirred under reflux for 1 hour, and the excess of the methanol was distilled off. The resulting product was extracted with diethyl ether. The extract was washed with water, and dried over anhydrous sodium sulfate. Then, the diethyl ether was distilled off from the extract. The resulting product was dissolved in 300 g of a 50% methanol solution of 1,8-diaza-bicyclo(5,4,0)-undecene-7. The solution was stirred under reflux for 5 hours, and then the methanol was distilled off. The resulting mixture was extracted with diethyl ether. The extract was washed with water, and dried over anhydrous sodium sulfate. The diethyl ether was distilled from the extract, and the reaction product was distilled in vacuum. Then, a mixture of the main fraction with 350 g of an alkaline aqueous solution of methanol (a mixture of 320 g of 25% sodium hydroxide and 30 g of methanol) was stirred under reflux for 1 hour, and acidified with dilute hydrochloric acid. The reaction product was extracted with diethyl ether. The extract was washed with water, and dried over anhydrous sodium sulfate. Then, the diethyl ether was distilled off from the extract. The reaction product was recrystallized from an 80% aqueous solution of methanol to afford 130 g (0.774 mole) of the compound of the formula

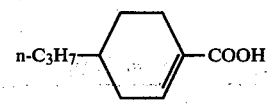

in a yield of 77.4%.

NMR (in CCl$_4$)

δ(PPM): 0.92 (t, 3H, —CH$_3$), 1.05–2.0 (m, 7H, —CH$_2$—,

—CH—), 2.0–2.6

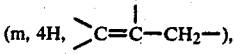 (m, 4H, >C=C-CH₂−), 7.04 (m, 1H,

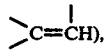 >C=CH), 12.31 (s, 1H, —COOH).

MATERIAL PRODUCTION EXAMPLES 2 TO 5

The procedure of Material Production Example 1 was repeated except that 1 mole of each of the following compounds was used instead of 1 mole of the compound

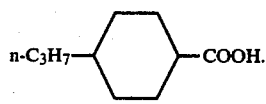 n-C₃H₇—⬡—COOH.

Compounds obtained are shown in Table 3.

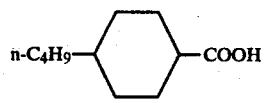 n-C₄H₉—⬡—COOH

 n-C₅H₁₁—⬡—COOH

 n-C₆H₁₃—⬡—COOH

 n-C₇H₁₅—⬡—COOH

Table 3

R₁—⬡—COOH

| Material Production Ex. | R₁ | Yield (%) | NMR (in CCl₄) |
|---|---|---|---|
| 2 | n-C₄H₉— | 77.4 | δ (PPM): 0.92 (t, 3H, —CH₃) |
| | | | 1.05-2.0 (m, 9H, —CH₂—, —CH—) |
| | | | 2.0-2.6 (m, 4H, >C=C—CH₂—) |
| | | | 7.04 (m, 1H, >C=CH) |
| | | | 12.19 (s, 1H, —COOH) |
| 3 | | | δ (PPM): |

Table 3-continued

R₁—⬡—COOH

| Material Production Ex. | R₁ | Yield (%) | NMR (in CCl₄) |
|---|---|---|---|
| | n-C₅H₁₁— | 76.5 | 0.92 (t, 3H, —CH₃) |
| | | | 1.05-2.0 (m, 11H, —CH₂—, —CH—) |
| | | | 2.0-2.6 (m, 4H, >C=C—CH₂—) |
| | | | 7.04 (m, 1H, >C=CH) |
| | | | 11.94 (s, 1H, —COOH) |
| 4 | n-C₆H₁₃— | 77.1 | δ (PPM): 0.92 (t, 3H, —CH₃) |
| | | | 1.05-2.0 (m, 13H, —CH₂—, —CH—) |
| | | | 2.0-2.6 (m, 4H, >C=C—CH₂—) |
| | | | 7.04 (m, 1H, >C=CH) |
| | | | 12.44 (s, 1H, —COOH) |
| 5 | n-C₇H₁₅— | 79.5 | δ (PPM): 0.92 (t, 3H, —CH₃) |
| | | | 1.1-2.1 (m, 15H, —CH₂—, —CH—) |
| | | | 2.0-2.6 (m, 4H, >C=C—CH₂—) |
| | | | 7.04 (m, 1H, >C=CH) |
| | | | 11.62 (s, 1H, —COOH) |

MATERIAL PRODUCTION EXAMPLE 6

137 g (1 mole) of the compound of the formula

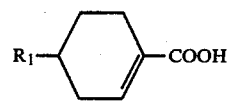 C₂H₅—O—⬡—NH₂ was mixed with 200 cc of water. To the mixture was gradually added dropwise 215 cc (2.5 moles) of conc. hydrochloric acid. After the addition, the mixture was reacted at 50° to 60° C. for 30 minutes. A solution of 1.1 g (1 mole) of 97% sodium nitrite in 200 cc of water was added dropwise to the resulting reaction mixture, and after the addition, the mixture was reacted for 1 hour at less than 5° C. Then, 321 g (2 moles) of potassium xanthogenate was dissolved in 400 cc of water, and the above reaction mixture was added dropwise to this solution over the course of 3 hours while maintaining it at 45° to 50° C. After the addition, the mixture was reacted at the same temperature for 1 hour. The reaction product was extracted with diethyl ether. The extract was washed with a 3% solution of sodium hydroxide, and dried over anhydrous sodium sulfate. The diethyl ether was then distilled off. The reaction product was dissolved in 1,000 ml of ethanol, and while refluxing the solution, 224.4 g (4 moles) of sodium hydroxide was gradually added. After the addition, they were reacted for 3.5 hours. The ethanol was distilled off from the reaction mixture, and water was added. Furthermore, the mixture was acidified with 6 N sulfuric acid, and the reaction product was extracted with diethyl ether. The extract was washed with water, and dried over anhydrous sodium sulfate, and then distilled to afford 86.2 g (0.56 mole) of the following compound in a yield of 56.0%.

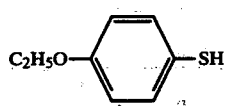

b.p. 90°-91° C./1.5 mmHg

MATERIAL PRODUCTION EXAMPLES 7 TO 9

The procedure of Material Production Example 6 was repeated except that 1 mole each of

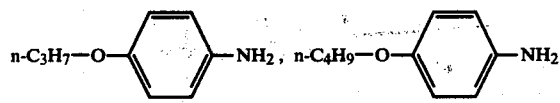

or 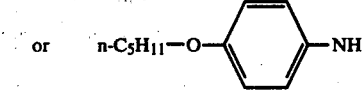

was used instead of 1 mole of the compound of the formula

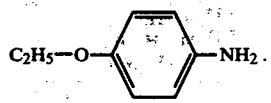

Compounds obtained are shown in Table 4.

Table 4

| Material Production Example | Yield (%) | Compound |
|---|---|---|
| 7 | 52.8 | n-C$_3$H$_7$—O—⟨⟩—SH b.p. 99° C./3 mmHg |
| 8 | 54.1 | n-C$_4$H$_9$—O—⟨⟩—SH b.p. 104°-105° C./3 mmHg |
| 9 | 50.7 | n-C$_5$H$_{11}$—O—⟨⟩—SH b.p. 126°-128° C./2 mmHg |

EXAMPLE 1

16.8 g (0.1 mole) of the compound of the formula

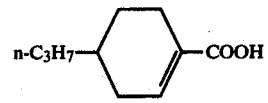

was dissolved in 50 g of thionyl chloride. The solution was reacted under reflux for 1 hour, and the excess of thionyl chloride was distilled off. The resulting reaction product was dissolved in 50 ml of diethyl ether, and to the solution was added 15.4 g (0.1 mole) of the compound of the formula

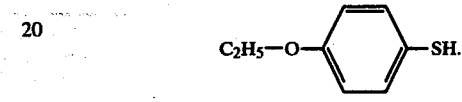

Subsequently, 20 g of pyridine was added dropwise at −10° C. After the addition, the reaction was continued for one hour at room temperature. The reaction mixture was washed with dilute hydrochloric acid and water, and dried over anhydrous sodium sulfate. Then, the diethyl ether was distilled off from the reaction mixture. Recrystallization of the reaction product from methanol afforded 19.4 g (0.0638 mole) of the following compound in a yield of 63.8%.

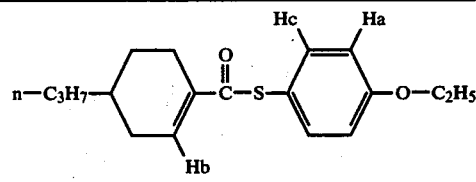

NMR (in CDCl$_3$)

δ (PPM):

0.90 (t, 3H, CH$_3$—C—C—)

1.39 (t, 3H, CH$_3$—C—O—)

1.08-2.60 (m, 11H, —CH$_2$—, —CH—)
3.96 (q, 2H, —CH$_2$—O—)
6.87 (d, 2H, Ha)
7.03 (m, 1H, Hb)
7.27 (d, 2H, Hc)

EXAMPLES 2 TO 5

The procedure of Example 1 was repeated except that 1 mole each of the following compounds was used instead of 1 mole of the compound of the formula

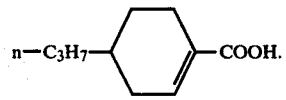

Compounds obtained are shown in Table 5.

5  
10  
15  
Table 5
| Example | $R_1$ | Yield (%) | NMR (in CDCl$_3$) |
|---|---|---|---|
| 2 | n-C$_4$H$_9$— | 62.4 | δ(PPM): 0.91 (t, 3H, CH$_3$—C—C—) 1.39 (t, 3H, CH$_3$—C—O—) 1.08–2.60 (m, 13H, —CH$_2$—, —CH—) 3.97 (q, 2H, —CH$_2$—O—) 6.87 (d, 2H, Ha) 7.03 (m, 1H, Hb) 7.27 (d, 2H, Hc) |
| 3 | n-C$_5$H$_{11}$— | 65.2 | δ(PPM): 0.91 (t, 3H, CH$_3$—C—C—) 1.38 (t, 3H, CH$_3$—C—O—) 1.08–2.60 (m, 15H, —CH$_2$—, —CH—) 3.97 (q, 2H, —CH$_2$—O—) 6.88 (d, 2H, Ha) 7.04 (m, 1H, Hb) 7.27 (d, 2H, Hc) |
| 4 | n-C$_6$H$_{13}$— | 61.9 | δ(PPM): 0.90 (t, 3H, CH$_3$—C—C—) 1.38 (t, 3H, CH$_3$—C—O—) 1.08–2.60 (m, 17H, —CH$_2$—, —CH—) 3.95 (q, 2H, —CH$_2$—O—) 6.88 (d, 2H, Ha) 7.03 (m, 1H, Hb) |

Table 5-continued

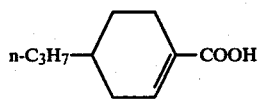

| Example | R₁ | Yield (%) | NMR (in CDCl₃) |
|---|---|---|---|
| 5 | n-C₇H₁₅— | 63.0 | 7.26 (d, 2H, Hc)<br>δ (PPM):<br>0.90 (t, 3H, CH₃—C—C—)<br><br>1.39 (t, 3H, CH₃—C—O—)<br><br>1.80–2.60 (m, 19H, —CH₂—, —CH—)<br>3.96 (q, 2H, —CH₂—O—)<br>6.87 (d, 2H, Ha)<br>7.04 (m, 1H, Hb)<br>7.27 (d, 2H, Hc) |

EXAMPLE 6

16.8 g (0.1 mole) of the compound of the formula

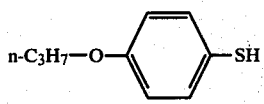

was dissolved in 50 g of thionyl chloride. The solution was reacted under reflux for 1 hour, and the excess of the thionyl chloride was distilled off. The resulting product was dissolved in 50 ml of diethyl ether, and to the solution was added 16.8 g (0.1 mole) of the compound of the formula n-C₃H₇—O—⟨⟩—SH at 0° C. Then, 20 g of pyridine was added dropwise at −10°C. After the addition, the reaction was continued for 1 hour at room temperature. The reaction mixture was washed with dilute hydrochloric acid and water, and dried over anhydrous sodium sulfate. The diethyl ether was then distilled off from the reaction mixture. Recrystallization of the reaction product from methanol afforded 20.6 g (0.0648 mole) of the following compound in a yield of 64.8%.

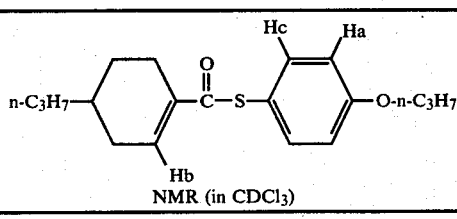

NMR (in CDCl₃)
δ (PPM):

-continued

NMR (in CDCl₃)

0.89 (t, 3H, CH₃—C—C—⟨⟩)

1.01 (t, 3H, CH₃—C—C—O—)

1.10–2.60 (m, 13H, —CH₂—, —CH—)
3.88 (t, 2H, —CH₂—O—)
6.86 (d, 2H, Ha)
7.02 (m, 1H, Hb)
7.25 (d, 2H, Hc)

EXAMPLES 7 TO 10

The procedure of Example 6 was repeated except that 1 mole of the following compounds was used instead of 1 mole of the compound of the formula

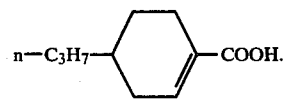

Compounds obtained are shown in Table 6.

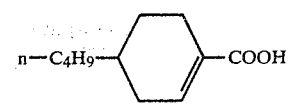
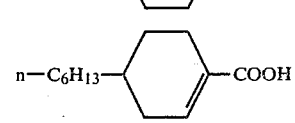
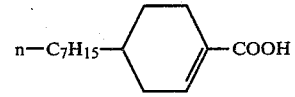
n—C₇H₁₅—⬡—COOH
Table 6
[Structure: R₁—cyclohexenyl—C(=O)—S—phenyl(with Hc, Ha)—O-n-C₃H₇, with Hb on cyclohexene]
| Example | R₁ | Yield (%) | NMR (in CDCl₃) |
|---|---|---|---|
| 7 | n-C₄H₉— | 60.6 | δ(PPM): 0.89 (t, 3H, CH₃—C—C—C—) 1.02 (t, 3H, CH₃—C—C—O—) 1.10–2.60 (m, 15H, —CH₂—, —CH—) 3.87 (t, 2H, —CH₂—O—) 6.86 (d, 2H, Ha) 7.03 (m, 1H, Hb) 7.26 (d, 2H, Hc) |
| 8 | n-C₅H₁₁— | 65.0 | δ(PPM): 0.88 (t, 3H, CH₃—C—C—C—) 1.01 (t, 3H, CH₃—C—C—O—) 1.10–2.60 (m, 17H, —CH₂—, —CH—) 3.86 (t, 2H, —CH₂—O—) 6.85 (d, 2H, Ha) 7.03 (m, 1H, Hb) 7.25 (d, 2H, Hc) |
| 9 | n-C₆H₁₃— | 63.1 | δ(PPM): 0.88 (t, 3H, CH₃—C—C—C—) 1.01 (t, 3H, CH₃—C—C—O—) 1.01–2.60 (m, 19H, —CH₂—, —CH—) 3.86 (t, 2H, —CH₂—O—) 6.04 (d, 2H, Ha) 7.02 (m, 1H, Hb) |

Table 6-continued

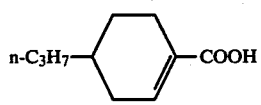

| Example | $R_1$ | Yield (%) | NMR (in CDCl$_3$) |
|---|---|---|---|
| 10 | n-C$_7$H$_{15}$— | 64.4 | 7.25 (d, 2H, Hc)<br>δ(PPM):<br>0.89 (t, 3H, CH$_3$—C—C—C—)<br>1.02 (t, 3H, CH$_3$(C—C—O—)<br>1.10–2.60 (m, 21H, —CH$_2$—, —CH—)<br>3.88 (t, 2H, —CH$_2$—O—)<br>6.85 (d, 2H, Ha)<br>7.02 (m, 1H, Hb)<br>7.26 (d, 2H, Hc) |

EXAMPLE 11

16.8 g (0.1 mole) of the compound of the formula

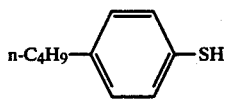

was dissolved in 50 g of thionyl chloride. The solution was reacted under reflux for 1 hour, and the excess of thionyl chloride was distilled off. The resulting product was dissolved in 50 ml of diethyl ether, and 18.2 g (0.1 mole) of the compound of the formula

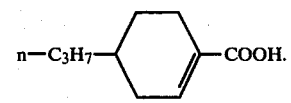

was added at 0° C. to the resulting solution. Subsequently, 20 g of pyridine was added dropwise at −10° C. After the addition, the reaction was continued for 1 hour at room temperature. Then, the reaction mixture was washed with dilute hydrochloric acid and water, and dried over anhydrous sodium sulfate. Then, the diethyl ether was distilled off from this reaction mixture. Recrystallization of the reaction product from methanol afforded 21.9 g (0.0660 mole) of the following compound in a yield of 66.0%.

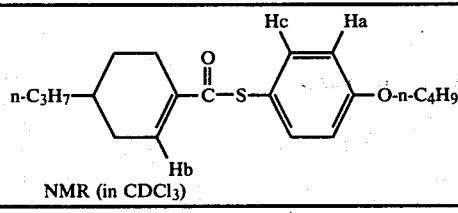

NMR (in CDCl$_3$)

δ(PPM):
0.90 (t×2, 6H, —CH$_3$)

-continued

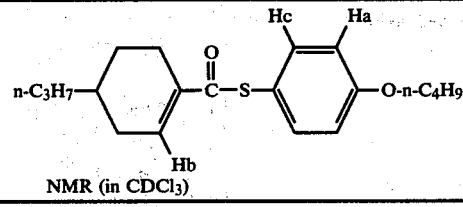

NMR (in CDCl$_3$)

1.10–2.60 (m, 15H, —CH$_2$—, —CH—)
3.93 (t, 2H, —CH$_2$—O—)
6.88 (d, 2H, Ha)
7.04 (m, 1H, Hb)
7.27 (d, 2H, Hc)

EXAMPLES 12 TO 15

The procedure of Example 11 was repeated except that 1 mole each of the following compounds was used instead of 1 mole of the compound of the formula n—C$_3$H$_7$—⌬—COOH.

Compounds obtained are shown in Table 7.

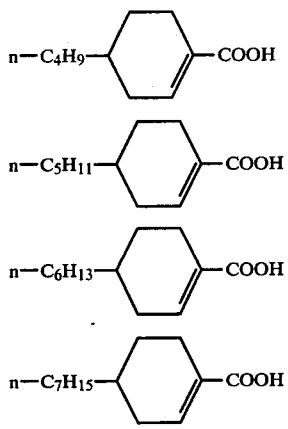

thionyl chloride was distilled off. The reaction product was dissolved in 50 ml of diethyl ether, and to the solution was added 19.6 g (0.1 mole) of the compound of the formula

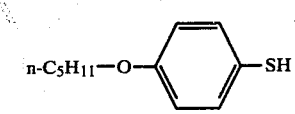

at 0° C. Subsequently, 20 g of pyridine was added dropwise at −10° C. After the addition, the reaction was continued for 1 hour at room temperature. The reaction mixture was washed with dilute hydrochloric acid and water, and dried over anhydrous sodium sulfate. The diethyl ether was distilled off from the reaction mixture. Recrystallization of the reaction product from methanol afforded 22.9 g (0.0662 mole) of the following compound in a yield of 66.2%.

Table 7

R₁—[cyclohexene]—C(=O)—S—[benzene with Hc, Ha, Hb]—O-n-C₄H₉

| Example | R₁ | Yield (%) | NMR (in CDCl₃) |
|---------|-----|-----------|----------------|
| 12 | n-C₄H₉— | 62.8 | δ(PPM): 0.90 (tx2, 6H, —CH₃) |
|  |  |  | 1.10–2.60 (m, 17H, —CH₂—, —CH—) |
|  |  |  | 3.94 (t, 2H, —CH₂—O—) |
|  |  |  | 6.87 (d, 2H, Ha) |
|  |  |  | 7.03 (m, 1H, Hb) |
|  |  |  | 7.27 (d, 2H, Hc) |
| 13 | n-C₅H₁₁— | 61.7 | δ(PPM): 0.89 (tx2, 6H, —CH₃) |
|  |  |  | 1.10–2.60 (m, 19H, —CH₂—, —CH—) |
|  |  |  | 3.93 (t, 2H, —CH₂—O—) |
|  |  |  | 6.88 (d, 2H, Ha) |
|  |  |  | 7.03 (m, 1H, Hb) |
|  |  |  | 7.26 (d, 2H, Hc) |
| 14 | n-C₆H₁₃— | 62.0 | δ(PPM): 0.90 (tx2, 6H, —CH₃) |
|  |  |  | 1.10–2.60 (m, 21H, —CH₂—, —CH—) |
|  |  |  | 3.94 (t, 2H, —CH₂—O—) |
|  |  |  | 6.87 (d, 2H, Ha) |
|  |  |  | 7.03 (m, 1H, Hb) |
|  |  |  | 7.26 (d, 2H, Hc) |
| 15 | n-C₇H₁₅— | 64.7 | δ(PPM): 0.90 (tx2, 6H, —CH₃) |
|  |  |  | 1.10–2.60 (m, 23H, —CH₂—, —CH—) |
|  |  |  | 3.93 (t, 2H, —CH₂—O—) |
|  |  |  | 6.88 (d, 2H, Ha) |
|  |  |  | 7.04 (m, 1H, Hb) |
|  |  |  | 7.04 (d, 2H, Hc) |

EXAMPLE 16

16.8 g (0.1 mole) of the compound of the formula

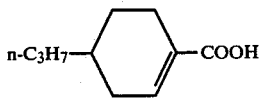

was dissolved in 50 g of thionyl chloride. The solution was reacted under reflux for 1 hour, and the excess of

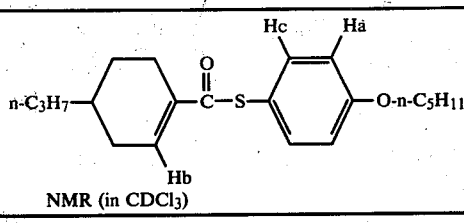

NMR (in CDCl₃)

$\delta$(PPM):
0.90 (tx2, 6H, —CH₃)

1.08–2.60 (m, —CH₂—, —CH—)
3.94 (t, 2H, —CH₂—O—)
6.88 (d, 2H, Ha)
7.03 (m, 1H, Hb)
7.27 (d, 2H, Hc)

EXAMPLES 17 TO 20

The procedure of Example 16 was repeated except that 1 mole each of the following compounds was used instead of 1 mole of the compound of the formula

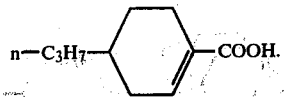

Compounds obtained are shown in Table 8.

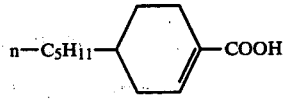

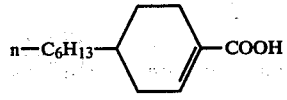

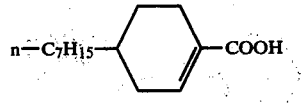

Table 8

| Example | R₁ | Yield (%) | NMR (in CDCl₃) |
|---|---|---|---|
| 17 | n-C₄H₉— | 65.2 | $\delta$(PPM): 0.89 (tx2, 6H, —CH₃) 1.08–2.60 (m, 19H, —CH₂—, —CH—) 3.95 (t, 2H, —CH₂—O—) 6.87 (d, 2H, Ha) 7.04 (m, 1H, Hb) 7.26 (d, 2H, Hc) |
| 18 | n-C₅H₁₁— | 66.3 | $\delta$(PPM): 0.90 (tx2, 6H, —CH₂) 1.08–2.60 (m, 21H, —CH₂—, —CH—) 3.95 (t, 2H, —CH₂—O—) 6.88 (d, 2H, Ha) 7.04 (m, 1H, Hb) 7.27 (d, 2H, Hc) |
| 19 | n-C₆H₁₃— | 64.9 | $\delta$(PPM): 0.90 (tx2, 6H, —CH₃) 1.08–2.60 (m, 23H, —CH₂—, —CH—) 3.94 (t, 2H, —CH₂—O—) 6.87 (d, 2H, Ha) 7.03 (m, 1H, Hb) 7.26 (d, 2H, Hc) |
| 20 | n-C₇H₁₅— | 64.2 | $\delta$(PPM): 0.90 (tx2, 6H, —CH₃) 1.08–2.60 (m, 25H, —CH₂—, —CH—) 3.95 (t, 2H, —CH₂—O—) 6.88 (d, 2H, Ha) 7.04 (m, 1H, Hb) 7.27 (d, 2H, Hc) |

What we claim is:

1. A compound of the formula

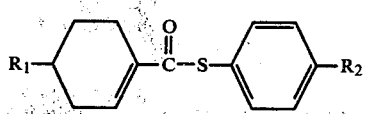

wherein $R_1$ represents a linear alkyl group containing 3 to 7 carbon atoms and $R_2$ represents a linear alkoxy group containing 2 to 5 carbon atoms.

2. The compound of claim 1 having the formula

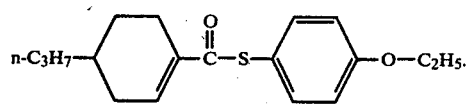

3. The compound of claim 1 having the formula

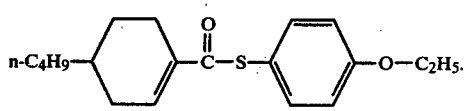

4. The compound of claim 1 having the formula

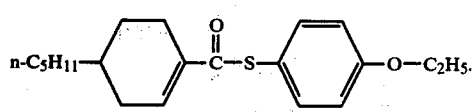

5. The compound of claim 1 having the formula

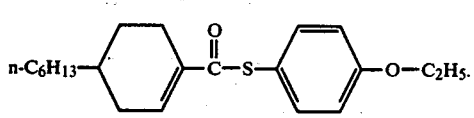

6. The compound of claim 1 having the formula

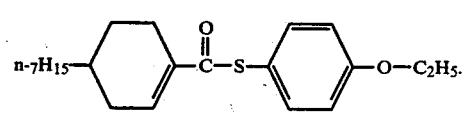

7. The compound of claim 1 having the formula

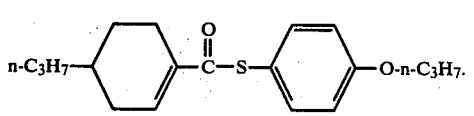

8. The compound of claim 1 having the formula

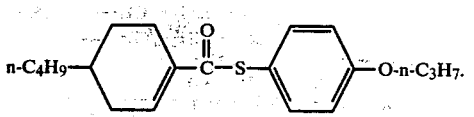

9. The compound of claim 1 having the formula

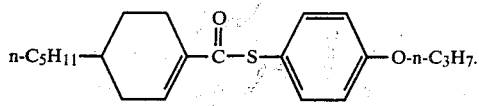

10. The compound of claim 1 having the formula

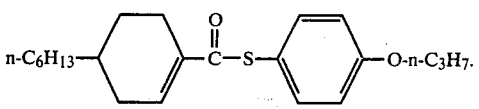

11. The compound of claim 1 having the formula

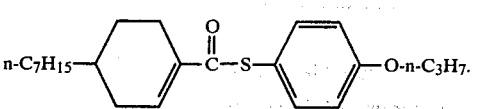

12. The compound of claim 1 having the formula

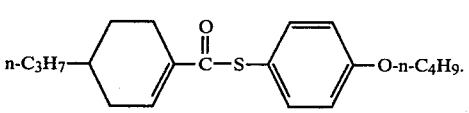

13. The compound of claim 1 having the formula

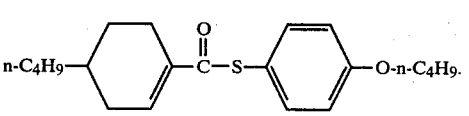

14. The compound of claim 1 having the formula

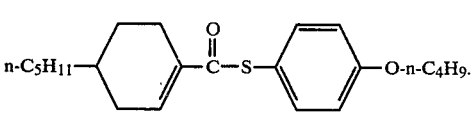

15. The compound of claim 1 having the formula

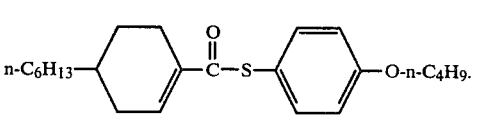

16. The compound of claim 1 having the formula

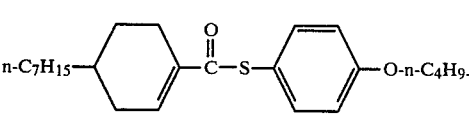

17. The compound of claim 1 having the formula

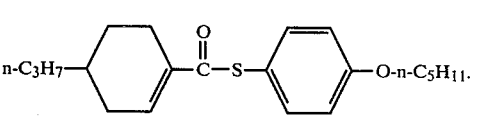

18. The compound of claim 1 having the formula

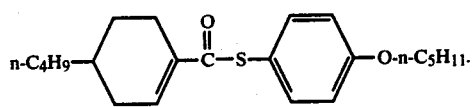
19. The compound of claim 1 having the formula
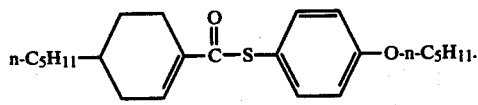
20. The compound of claim 1 having the formula
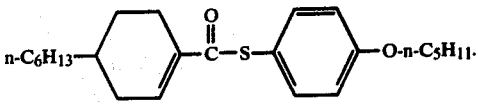
21. The compound of claim 1 having the formula
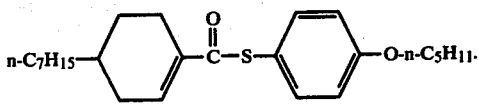
* * * * *